United States Patent [19]
Richert

[11] Patent Number: 5,253,969
[45] Date of Patent: Oct. 19, 1993

[54] FEEDING SYSTEM FOR STRIP MATERIAL, PARTICULARLY IN TREATMENT PLANTS FOR METAL STRIPS

[75] Inventor: Withold Richert, Hückelhoven, Fed. Rep. of Germany

[73] Assignee: SMS Schloemann-Siemag Aktiengesellschaft, Düsseldorf, Fed. Rep. of Germany

[21] Appl. No.: 883,814

[22] Filed: May 11, 1992

Related U.S. Application Data

[63] Continuation of Ser. No. 491,946, Mar. 12, 1990, abandoned.

[30] Foreign Application Priority Data

Mar. 10, 1989 [DE] Fed. Rep. of Germany ....... 3907749

[51] Int. Cl.⁵ .............................................. B23Q 5/00
[52] U.S. Cl. .................................... 414/17; 198/619; 271/193
[58] Field of Search ............... 414/14, 17, 20, 749, 414/751; 226/148, 149, 162, 173; 271/193, 264, 268; 198/619

[56] References Cited

U.S. PATENT DOCUMENTS

| 3,188,709 | 6/1965 | Olsen | 226/162 |
| 3,611,858 | 10/1970 | Beatty et al. | 414/20 X |
| 4,177,892 | 12/1979 | Jespersen et al. | 226/162 X |
| 4,624,617 | 11/1986 | Belna | 198/619 X |
| 4,915,283 | 4/1990 | Buchko et al. | 226/173 |

FOREIGN PATENT DOCUMENTS 225108 10/1987 Japan ................................... 198/619
1333943 10/1973 United Kingdom.

OTHER PUBLICATIONS

Glueckauf, Band 109, No. 5, 1973, pp. 308–315, R. Schuetz: "Asynchrone Linearmotoren und ihre Anwendungen".

Primary Examiner—Michael S. Huppert
Assistant Examiner—Donald W. Underwood
Attorney, Agent, or Firm—Anderson Kill Olick & Oshinsky

[57] ABSTRACT

A feeding system for strip material for transporting a strip over a conveying distance of limited length, particularly in treatment plants for metal strip. The feeding system includes a transfer carriage which is guided on a rail guide. The transfer carriage has a chamber for receiving the strip and is provided with a device for temporarily holding the beginning of the strip. The transfer carriage has at both sides thereof a reversible linear motor each for driving the transfer carriage over the conveying distance.

4 Claims, 7 Drawing Sheets

FEEDING SYSTEM FOR STRIP MATERIAL, PARTICULARLY IN TREATMENT PLANTS FOR METAL STRIPS

This is a continuation of Ser. No. 07/491,946, filed Mar. 12, 1990, now abandoned.

BACKGROUND OF THE INVENTION

1. Field of the Invention

The present invention relates to a feeding system for strip material for transporting a strip over a conveying distance of limited length, particularly in treatment plants for metal strip.

2. Description of the Related Art

A feeding system of the above-described type can best be explained with the aid of pickling lines for metal strip. Pickling plants which have been built in the past are of three different types:

a) pusher-type pickling plants for productions of about 300,000 tons/year;

b) semi-continuous pickling plants for productions of about 500,000 tons/year; and c) continuous pickling plants for productions of up to 2,300,000 tons/year.

A comparison of the three types of pickling plants shows that the semi-continuous pickling plant and the continuous pickling plant operate in accordance with the same system, i.e., they utilize an endless belt. They only differ from each other with respect to the more-or-less complicated mechanical devices for bridging the idle periods during entry and exit, such as during coil exchange and welding.

In the pusher-type pickling plant, each strip is newly inserted and a pulling force is applied only after three windings of the strip beginning have been wound onto the coiler and the plant is subsequently accelerated to pickling speed. The particularly simple machine equipment of the pusher-type pickling plant (the plant includes only an uncoiler, a straightening machine, a pickling part, transverse cutting shears and a coiler) has been the reason that it was frequently attempted to increase the efficiency by increasing the inserting speed and by providing additional guide systems. In thin strips having an approximate strip thickness of below 2.5 mm, additional difficulties occur if such non-stiff strips are to be advanced over the necessary distance. For the above reasons, the pusher-type pickling plant has not been used very often.

It is, therefore, the primary object of the present invention to provide a feeding system for strip material which can be used equally for thin and thick strips and, when used in pickling plants, are equivalent in operation to a continuous pickling plant, even though the supply of strip is discontinuous, as is the case in a pusher-type pickling plant.

SUMMARY OF THE INVENTION

In accordance with the present invention, the above-described object is met by a feeding system which includes a transfer or pulling carriage which is guided on a rail guide. The transfer carriage has a chamber for receiving the strip and is provided with a device for temporarily holding the beginning of the strip. The transfer carriage has at both sides thereof a reversible linear motor each for driving the transfer carriage over the conveying distance.

The above features of the present invention make it possible to provide a novel pull-type pickling plant in which the insertion times for each individual strip are substantially reduced.

In accordance with a further feature of the present invention, the current-carrying active motor components of the linear motors are integrated in the rail guide, while the reaction components of the linear motors consisting of permanent magnets are integrated in the transfer carriage. As a result, it is not necessary to supply electric energy to the transfer carriage, so that the use of a cable dragging chain or the like is unnecessary.

In accordance with a further aspect of the invention, the transfer carriage is plate-shaped and is provided at both sides thereof with vertically extending flanges and with horizontally extending flanges connected to the vertically extending flanges. The flanges extend in travel direction of the carriage and form chambers which are open toward the inside. The rail guide has outwardly directed horizontal webs which engage in the chambers in a labyrinth-like manner. The rail guide has additional outer horizontal webs and vertically upwardly extending webs, wherein the horizontal web is located underneath the horizontal flange of the transfer carriage and the vertical webs are located outside of the vertically extending flange of the carriage. The vertical and horizontal flanges of the transfer carriage are equipped with guide rollers whose axes extend vertically or horizontally, respectively. The guide rollers guide the transfer carriage on the vertical and horizontal webs of the rail guide. The horizontal webs of the rail guide extending into the chambers are provided on their bottom surfaces with the active motor components and the horizontal flanges of the transfer carriage are provided on their upper surfaces with the permanent magnets of the reaction components of the linear motors.

In accordance with another feature of the invention, the transfer carriage is plate-shaped and has outwardly extending edges which extend into chambers of the rail guide which extend in travel direction and are open to the inside. The carriage edges have on their upper surfaces the permanent magnets of the reaction components and the walls of the rail guide which form the upper boundary of the chambers are provided with the active motor components of the linear motors. The magnetic force of the permanent magnets is such that the edges of the transfer carriage and, thus, the transfer carriage itself is guided within the chambers of the rail guide in a levitated state similar to a levitated train.

In accordance with a preferred device for the holding by means of frictional engagement of the beginning of the strip within the transfer carriage, the device for the temporary holding of the beginning of the strip is a clamping means actuated by compressed air by virtue of an overlaying inflatable air cushion and is fixed within the chamber of the plate-like transfer carriage, so that the inserted beginning of the strip is clamped by the clamping means against the ground plate of the chamber. The transfer carriage is furnished with so-called fixed docking plates for introducing, blocking and releasing the compressed air both into and out of the air cushion. At the beginning and at the end of the conveying distance, a coupling docking plate each is provided which is movable back and forth over a coupling distance. The movable docking plates are connected through hose lines to stationary compressed air sources.

The fixed docking plate of the transfer carriage and the movable docking plates are equipped at their oppositely located end faces with compressed air-operated stretching connections for compressed air with pressure maintaining function and are equipped for the temporary coupling of the movable docking plates to the fixed docking plate of the carriage, so that the beginning of the strip is clamped during the movement and is released after the beginning of the strip has reached the end of the conveying distance. With respect to the docking system described above, reference is made to DE-A1-3519019, DE-A1-3023359 and EP-A-0162187.

DE-A1-3519019 discloses a docking system comprising a connection system that includes two media connected multiple couplings and in which each of the two multiple couplings is outfitted with plate-shaped coupling halves in which the media-transporting plug-in and socket parts of the individual couplings are comprised and fastened. The plate-shaped coupling halves are pivot-centered relative to one another and detachably held in a coupling position relative to one another by means of ball locking means. The two detachable plate-shaped coupling halves of every coupling pair are arranged at a rigid girder or carrier during the coupling process, wherein one coupling half of the coupling pair is movable relative to the other coupling half. The movable coupling half can be hooked into hooks provided at the end of the carrier and is provided with gripping heads which engage in undercut pockets of the corresponding rigid coupling halves. A piston-cylinder unit is provided for carrying the coupling and uncoupling procedure.

The above-described features make it possible to operate without problems from the outside the two releasable coupling halves, even though the coupling devices are two-dimensional. The piston-cylinder unit serves to effect the coupling procedure of the multiple coupling by means of a pressure medium by pulling in the piston shaft which is equipped with the gripping head and which provides the coupling action. As a result, the two coupling halves are moved into the closing position after they were previously moved into the necessary linear alignment. The coupling is effected completely neutral with respect to outside forces, i.e., without external abutment.

DE-A1-3023359 discloses a docking system including a multiple quick-action coupling in which the respective coupling halves re combines in a coupling carrier plate each, and wherein the two coupling carrier plates can be pulled toward each other by means of a cylinder-piston unit into the coupling position. The piston-cylinder unit is controlled by a pressure medium and is mounted on one of the coupling carrier halves. A free end of the piston is locked-in in an advanced position thereof together with pawls of a locking sleeve arranged on the other coupling carrier plate, wherein the locking sleeve is displaceable into a released position against the force of a spring by means of a plunger which is axially displaceably mounted in the piston.

EP-A-0162187 discloses another quick-action coupling system for a tool carrier on a robot arm. The system includes a robot with a tool carrier releasably arranged at the head end of the robot arm. For effecting an exchange of tool carrier a quick-acting multiple coupling is provided in which the coupling halves are combined into a coupling carrier plate on the side of the tool carrier and on the side of the robot head. The two coupling carrier plates can be moved toward each other into the coupled position of the coupling halves by means of a pressure medium-controlled cylinder-piston unit arranged on the coupling carrier plate on the side of the robot head.

The common basic technical and operating principle of a docking system, representative of the docking system applied in the transfer carriage, is demonstrated completely and in detail in the aforementioned patents. The time for the temporary coupling of the movable docking coupling plates to the fixed docking plate on the carriage side is apparent from the mode of operation of the device and follows compulsorily. At the beginning of the conveying distance, the air cushion of the transporting carriage is connected to a stationary compressed air source via hose lines by means of one of its docking plates and the docking coupling plate which is movably arranged at the beginning of the conveying distance for the frictional engagement of a strip beginning. To this end, the fixed docking plate, which is securely arranged at the transfer carriage and the docking coupling plate which is movable opposite the latter and has compressed air operated plug-in connections for compressed air provides a pressure retaining function for the temporary mutual coupling corresponding to the aforementioned prior art. A control then ensures that the compressed air flows into the air cushion, specifically as soon as the strip beginning is inserted into the transfer carriage. At the end of the conveying distance, the opposite fixed docking plate is connected via a similar docking system at the front side of the transfer carriage with a movable docking coupling plate via hose lines at a control for the compressed air which is suitable to produce a negative pressure to relieve the air cushions. The clamping connection between the carriage and the strip at the end of the moving distance is then accordingly disengaged.

In accordance with a further development of the feeding system with fixed docking plate of the transfer carriage and with compatible coupling docking plates which are movable back and forth over a coupling distance at the beginning and the end of the conveying distance for operating the clamping device and for receiving the beginning of a strip and for inserting the strip, the compressed air-operated clamping device includes a closed air cushion and a control for the compressed air in order to generate a negative pressure when the pressure in the air cushion is released. The compressed air cushion element with distributed air outlets cooperates by virtue of the underlaying clamping plate with the bottom plate of the chamber for generating a friction of coefficient force, wherein the beginning of the strip can be clamped between the clamping plate and the bottom front. The clamping plate is arranged underneath the compressed air cushion element and rests on a pair of compressed air operated lifting elements for lifting the clamping plate after the compressed air cushion has completely evacuated.

In accordance with another embodiment of the invention, for the frictionally engaging holding of the strip beginning, the device for temporarily holding the beginning of the strip includes at least one row of rotary wedges which are freely rotatably suspended on pivot axes above the chamber of the transfer carriage which receives the strip. Each rotary wedge has a curved outer clamping surface which extends eccentrically relative to the pivot axis, so that the beginning of the strip which rests on the lower chamber wall of the transfer carriage rests on the surface of the strip beginning with frictional engagement before the stable suspended position of the rotary wedge is reached, regardless of the thickness of the strip and that the beginning of the strip is automatically clamped by a rotary movement of the rotary wedge against the lower chamber wall when the transfer carriage is started in the conveying direction until, at the end of the conveying distance, a relative movement between the transfer carriage and the strip turns the rotary wedge backwards and the clamped connection is automatically released.

Each rotary wedge has an actuating arm which extends out of slots provided in the upper chamber wall of the transfer carriage. In the starting position of the transfer carriage, each actuating arm cooperates with a stationary insertion cam which acts to support the clamping process. In the end position of the transfer carriage, each actuating arm cooperates with a stationary disengagement cam with a contact surface for releasing the clamped connection.

The contact surfaces of the disengagement cams extend into a horizontal portion at which they have a distance from the pivot axes of the rotary wedges which distance causes a return rotation of the rotary wedges into the region of holding devices on the transfer carriage, wherein the holding devices on the transfer carriage have a holding force which can be overcome by contact of the actuating arms against the insertion cams. The holding devices on the transfer carriage may be permanent magnets.

The beginning of the strip may also be temporarily held in the transfer carriage by a positively locking engagement. In this case, the device for temporarily holding the beginning of the strip includes at least one row of pivot levers which are rotatably suspended on pivot axes above the chamber of the transfer carriage which receives the strip. The lower border wall of the chamber has recesses in vertical alignment with each pivot lever. The pivot levers are movable from an inclined position directed in feeding direction into a stable suspended position in order to lock the beginning of the strip provided with corresponding holes to the transfer carriage in a positively engaging manner when the transfer carriage is started in conveying direction until, at the end of the conveying distance, a relative movement between the transfer carriage and the strip pivots the pivot levers back into the unlocked inclined position.

Each pivot lever has an actuating arm which extends through slots in the upper chamber wall of the transfer carriage. In the starting position of the transfer carriage, each actuating arm cooperates with a stationary insertion cam for transferring the pivot lever from its inclined position into the locking stable suspended position. In the end position of the transfer carriage, each actuating arm cooperates with a stationary disengagement cam with a contact surface for returning the pivot lever into the inclined position and for unlocking the beginning of the strip.

The contact surfaces of the disengagement cams extend into a horizontal portion at which they have a distance from the pivot axes of the pivot levers, wherein the distance causes a return rotation of the pivot levers into the inclined position in which the pivot levers are held by holding devices of the transfer carriage, wherein the holding devices on the transfer carriage have holding force which can be overcome by a contact of the actuating arms with the insertion cams. The holding devices on the transfer carriage may be permanent magnets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

In the Drawing:

FIG. 3b is a partial sectional view, on a larger scale, of the holding device of FIG. 3a;

FIG. 4b is a partial sectional view, on a larger scale, of the holding device of FIG. 4a;

DESCRIPTION OF THE PREFERRED EMBODIMENTS

Figure 1:
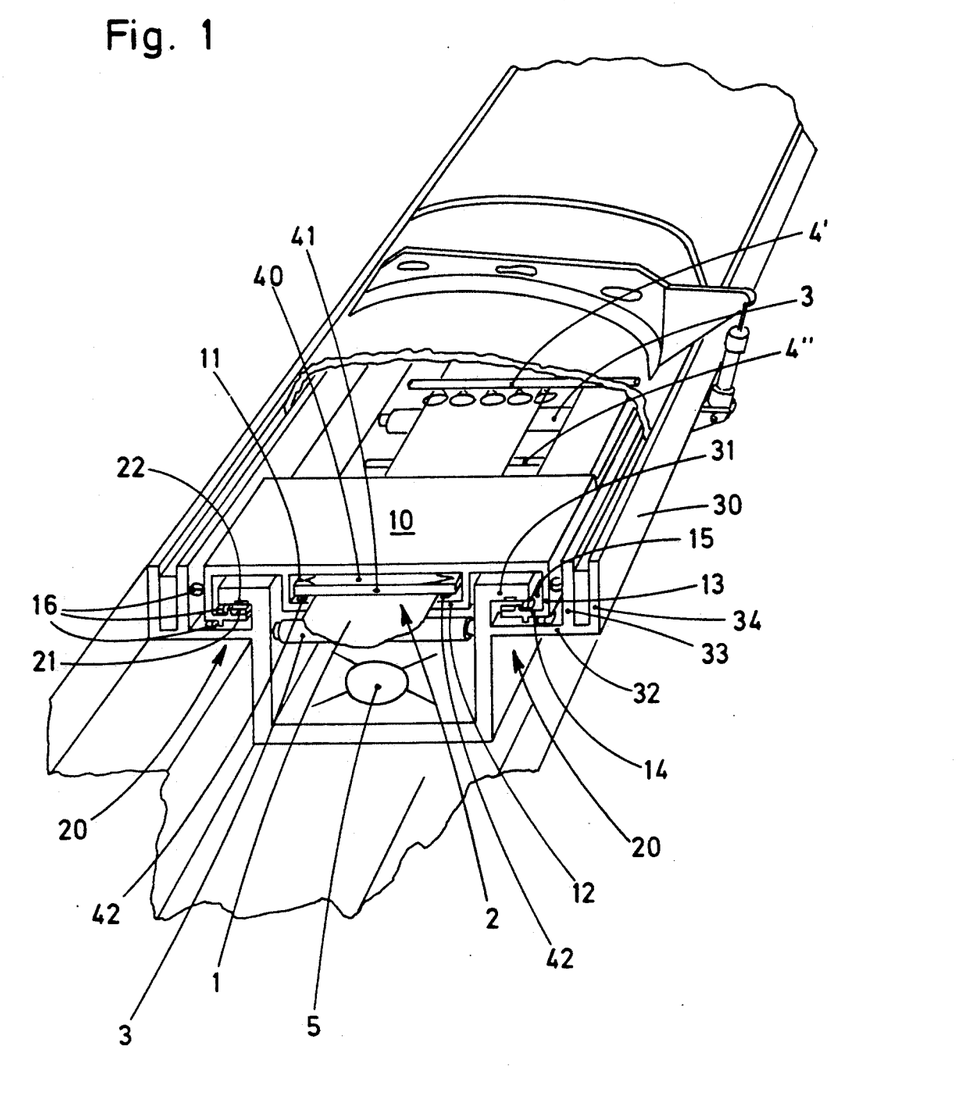
FIG. 1 is a schematic perspective view, partially in section, of a feeding system for strip material according to the present invention.

FIG. 1 of the drawing shows a feeding system for strip material according to the present invention. The feeding system is used for transporting a metal strip 1 in a pickling plant (cf. reference character L in FIGS. 5 and 6) over a conveying distance having a length of approximately 100 to 300 meters. The strip or strip beginning 1 is temporarily held by means of a holding device 2 in a transfer or pulling carriage 10 or in a chamber 11 of the carriage. The strip or strip beginning 1 is conveyed over the conveying distance L along a rail guide 30 by means of a reversible linear motor 20, each arranged at the edges of the carriage 10. In the pickling plant through which the strip beginning 1 is pulled by the transfer carriage 10, the strip is placed in the known manner on support rollers 3 or on the bottom of the pickling containers and is sprayed with acid from the top and from below through spray pipes 4', 4". The strip may also be pulled through an acid bath. The acid is removed through outlets 5. The maximum conveying speed is approximately 10 m/s with a pulling force of 10 kN.

The current carrying active motor components 22 of the linear motors 20 are integrated in the rail guide 30, while the reaction components 21 of the linear motors composed of permanent magnets are integrated in the transfer carriage 10. The transfer carriage 10 is plate-shaped and has at the edges thereof downwardly directed, vertically extending flanges 13 and horizontally extending flanges 14 connected to the flanges 13. The flanges 13, 14 form chambers 15 which are open toward the inside and extend in travel direction. The rail guide 30 has outwardly directed, horizontally extending webs 31 which extend into the chambers 15 in the manner of a labyrinth. The rail guide 30 has additional outer horizontal webs 32 and vertically upwardly extending webs 33, 34. The horizontal web 32 extends underneath the horizontal flange 14 of the transfer carriage 10 and the vertical webs 33, 34 extend outside of the vertical flange 13 of the transfer carriage 10. The vertical and horizontal flanges 13, 14 of the transfer carriage 10 are provided with guide rollers 16 having vertical or horizontal axes, respectively. The guide rollers 16 support and guide the transfer carriage 10 on the vertical and horizontal webs 33; 32, 31 of the rail guide 30. The horizontal webs 31 of the rail guide 30 extending into the chambers 15 are provided on their bottom surfaces with the active motor components 22 and the horizontal flanges 14 of the transfer carriage 10 are provided on their upper surfaces with the permanent magnets of the reaction components 21 of the linear motors 20.

The compressed air-operated clamping device 2 preferably is actuated by at least one closed air cushion 40 and further a control for the compressed air in order to generate a negative pressure when the pressure is released. Preferably, a compressed air cushion element with distributed air outlets is used. For generating a sufficient coefficient of friction force, a clamping plate 41 which can be clamped to the strip beginning 1 is pressed down by the compressed air cushion element. The clamping plate 41 is arranged underneath the compressed air cushion element 40 and rests on a pair of compressed air-operated lifting elements 42. The strip beginning 1 which has been inserted is clamped between the clamping plate 41 and the bottom plate 12 of the chamber 11.

Figure 7:
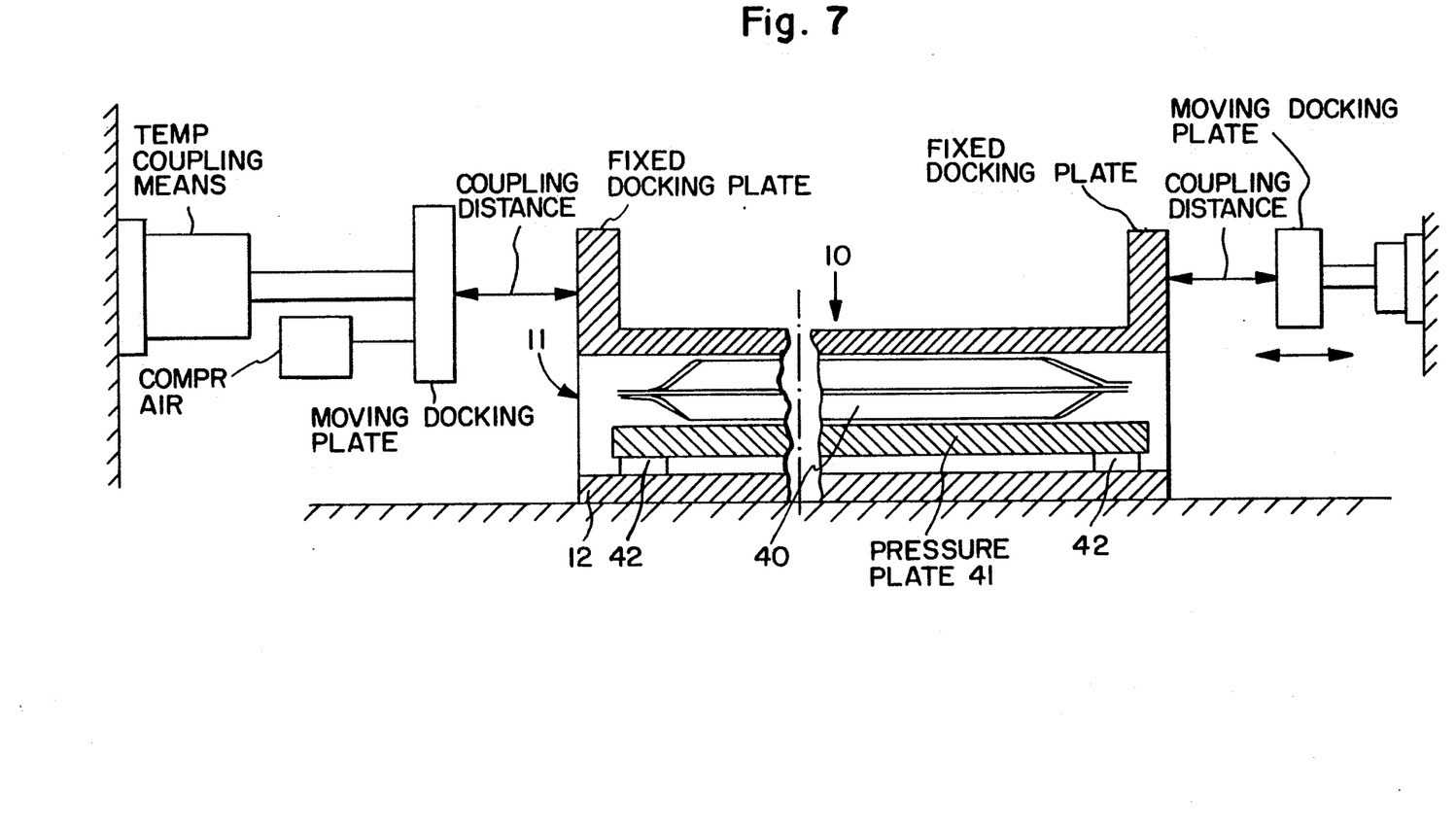
FIG. 7 is a schematic cross-sectional view of the feeding system according to the present invention.

For introducing, blocking and releasing the compressed air, the transfer carriage 10 is constructed as a so-called fixed docking plate, shown in FIG. 7, for cooperating with coupling docking plates which can be moved back and forth over a coupling distance in conveying direction and provided at the beginning and at the end of the conveying distance L. Each coupling docking plate is connected through hose lines to stationary compressed air sources. The fixed docking plate of the transfer carriage and the movable docking plates are equipped at their oppositely located end edges with compressed air-operated stretching connections for compressed air with pressure maintaining function and for temporarily coupling the movable docking plates to the fixed docking plate on the carriage in order to clamp and release the strip beginning during the movement and release the same after the strip beginning has reached the end of the conveying distance L.

In the modified configuration of the transfer carriage 10 illustrated in FIG. 2, the carriage is again plate-shaped, however the carriage has outwardly directed edges 17 which extend in travel direction and engage in inwardly open chambers 35 of the rail guide 30. The edges 17 are provided on their upper surfaces with the permanent magnets of the reaction components 21 of the linear motors 20 and the walls 36 of the rail guide 30 which form the upper border of the chamber are provided with the active motor components 22. However, it is also possible to attach wheels having horizontal and vertical axes to the outwardly directed edges 17, so that the carriage 10 is supported in the same manner as the carriage shown in FIG. 1. Thus, another solution for guiding the transfer carriage is provided.

Figure 2:
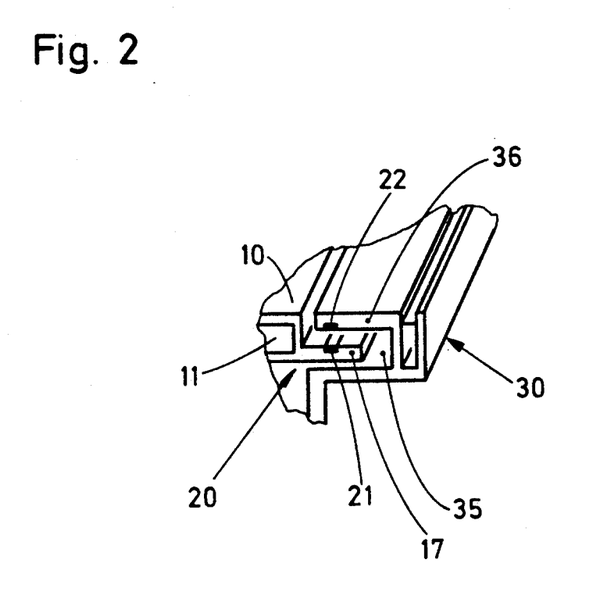
FIG. 2 is a partial perspective view of a different embodiment of a linear motor of the system of FIG. 1.

In another development of the invention shown in FIGS. 1 and 2, the permanent magnets 21 have such a magnetic force that the edges 17 of the transfer carriage and, thus, the transfer carriage 10 proper, are guided and levitated within the chambers 35 of the rail guide 30 in the manner of a levitated train. In this case, guide rollers as they are shown in FIGS. 1, reference numeral 16, are not provided.

Figure 3A:
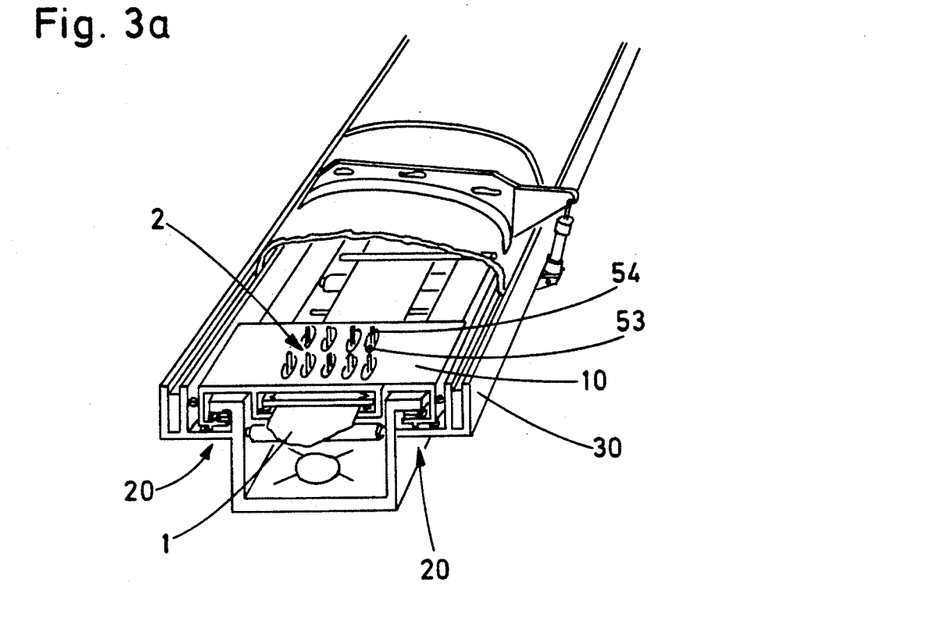
FIG. 3a is a perspective view similar to FIG. 1, on a smaller scale, showing a different embodiment of the holding device of the feeding system.
Figure 3B:
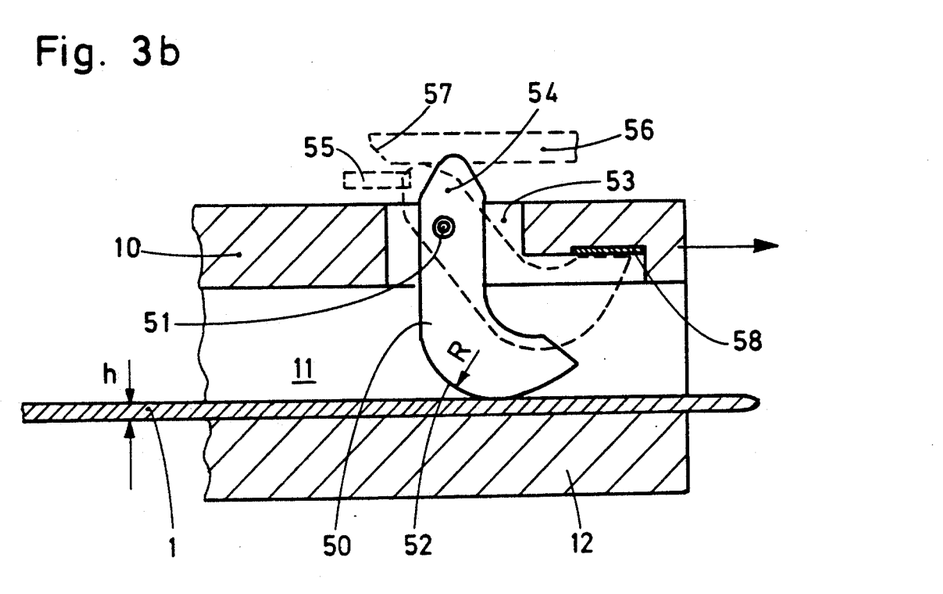

As shown in FIGS. 3a and 3b, the holding device 2 for holding the strip beginning 1 with frictional engagement may also be composed of at least one row or rotary wedges 50 which are mounted freely suspended from pivot axes 51 above the chamber 11 of the transfer carriage 10 which receives the strip. The curved outer clamping surface 52 of each rotary wedge extends eccentrically relative to the pivot axis, so that the strip beginning 1 resting on the lower chamber wall 12 of the transfer carriage 10 rests with frictional engagement on the surface of the strip beginning 1 before the stable hanging position of the rotary wedge 50 is reached, regardless of the thickness h of the strip. When the transfer carriage 10 is started in conveying direction, the strip is automatically clamped to the lower chamber wall 12 as a result of a rotary movement of the rotary wedge 50. At the end of the conveying distance L, a relative movement between the transfer carriage 10 and the strip 1 causes the rotary wedge 50 to be turned back and the clamped connection to be automatically released.

In the embodiment illustrated in FIGS. 3a and 3b, each rotary wedge 50 has an actuating arm 54 which extends out of a slot 53 in the upper chamber wall of the transfer carriage 10. In the starting position of the transfer carriage 10, each actuating arm 54 cooperates with a stationary insertion cam 55 for reinforcing the clamping procedure. In the end position of the transfer carriage, a stationary disengagement cam 56 cooperates with a contact surface 57 for releasing the clamped connection. The contact surfaces 57 of the disengagement cams 56 extend into a horizontal portion, wherein the distance between the horizontal portion and the pivot axis 51 of each rotary wedge 50 causes a return rotation of the rotary wedges 50 into the region of holding devices 58 on the transfer carriage 10. The holding force of the holding devices 58 can be overcome when the actuating arms 54 contact the insertion cams 55. The holding devices 58 preferably are permanent magnets.

Figure 4A:
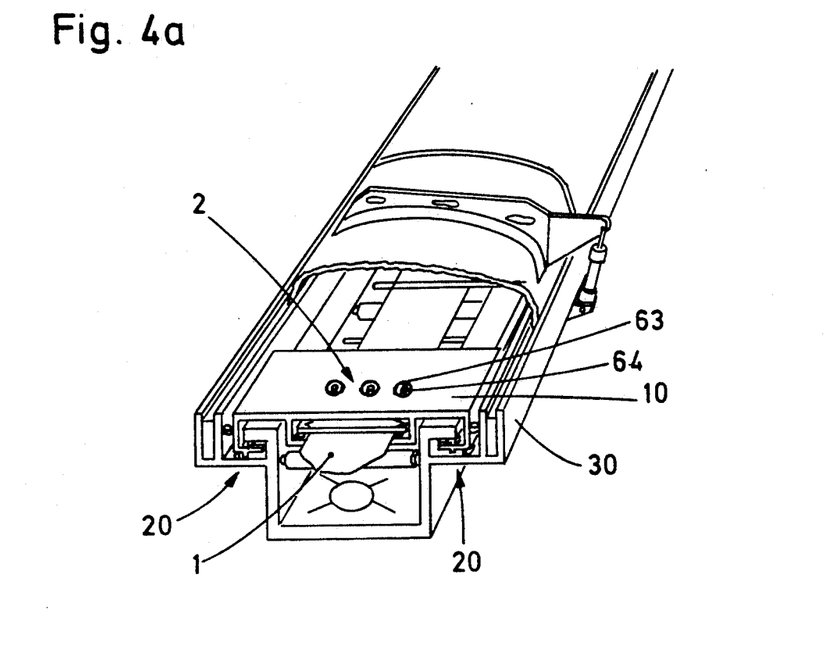
FIG. 4a is a perspective view similar to FIG. 1, on a smaller scale, showing a different embodiment of the holding device of the feeding system.
Figure 4B:
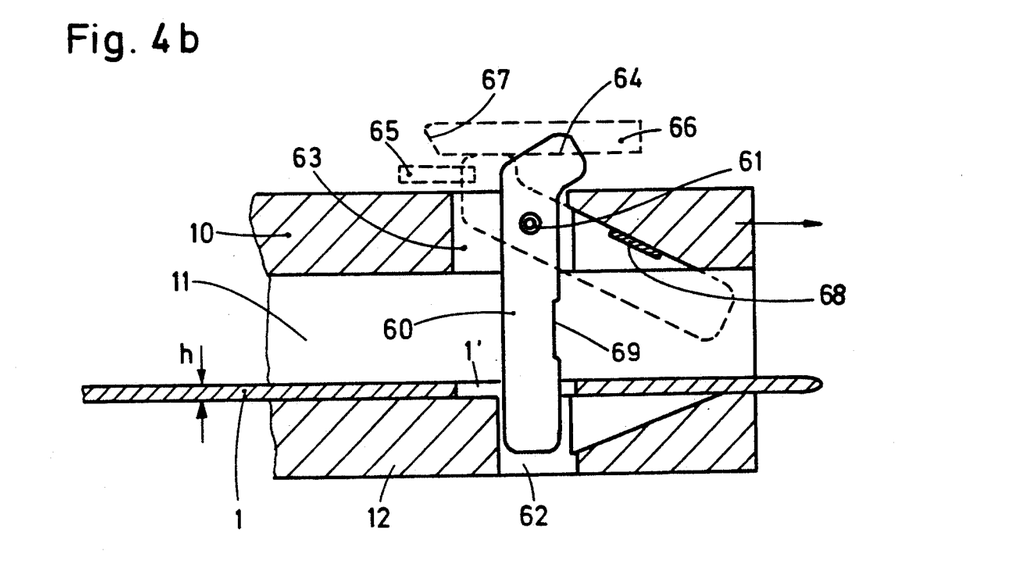

The holding device 2 illustrated in FIGS. 4a and 4b operates with positively locking engagement. The holding device 2 includes at least one row of pivot levers 60 which are rotatably suspended on pivot axes 61 above the chamber 11 of the transfer carriage 10 receiving the strip. The lower border wall 12 of the chamber 11 is provided with recesses 62 in perpendicular alignment with each pivot lever 60. The pivot levers 60 are capable of engaging in the recesses 62 from an inclined position directed in feed direction into a stable suspended position, in order to lock the strip beginning 1 provided with corresponding punched holes 1' to the transfer carriage 10 in a positively locking manner when the transfer carriage 10 is started in conveying direction. At the end of the conveying distance L, the pivot levers 60 are swung back into the unlocked inclined position as a result of a relative movement between the transfer carriage 10 and the strip.

Each pivot lever 60 has an actuating arm 64 which extends out of a slot 63 in the upper chamber wall of the transfer carriage 10. In the starting position of the transfer carriage 10, each actuating arm 64 cooperates with a stationary insertion cam 65 for transferring the pivot lever 60 from its inclined position into the locking stable hanging position. In the end position of the transfer carriage 10, a stationary disengagement cam 66 cooperates with a contact surface 67 for returning the pivot lever into the inclined position and for unlocking the strip beginning 1. The contact surfaces 67 of the disengagement cams 66 extend into a horizontal portion. The distance between the horizontal portion and the pivot axis 61 of the pivot levers 60 such that it causes a return rotation of the pivot levers 60 into the inclined position in which the pivot levers 60 are held by means of holding devices 68 of the transfer carriage with a holding force which can be overcome by a contact of the actuating arms 64 with the insertion cams 65. The holding devices 68 preferably are permanent magnets. In addition, surfaces 69 are provided on the pivot levers 60. The surfaces 69 are lifted against permanent magnets 68 provided on the transfer carriage 10 when the cam 66 has raised the pivot levers 60 in the end position of the transfer carriage 10. The force of the permanent magnets 68 is selected so that the pivot levers 60 securely held and do not have contact with the strip 1 when the transfer carriage 10 is returned. In the starting position of the transfer carriage 10, the connection between the pivot levers and the permanent magnets 68 is disconnected by the stationary, spring-biased cam 65.

Figure 5:
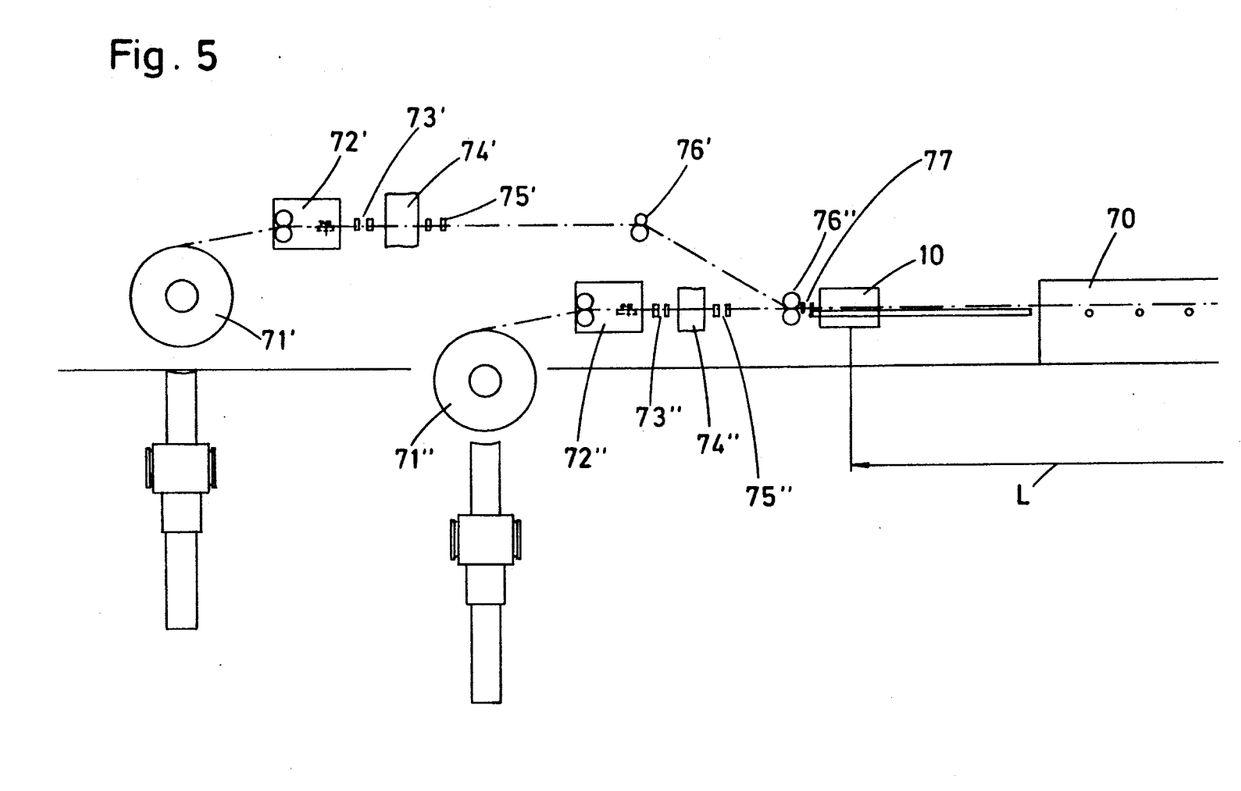
FIG. 5 is a schematic view of the entry portion of a pickling plant with the transfer carriage in the starting position.
Figure 6:
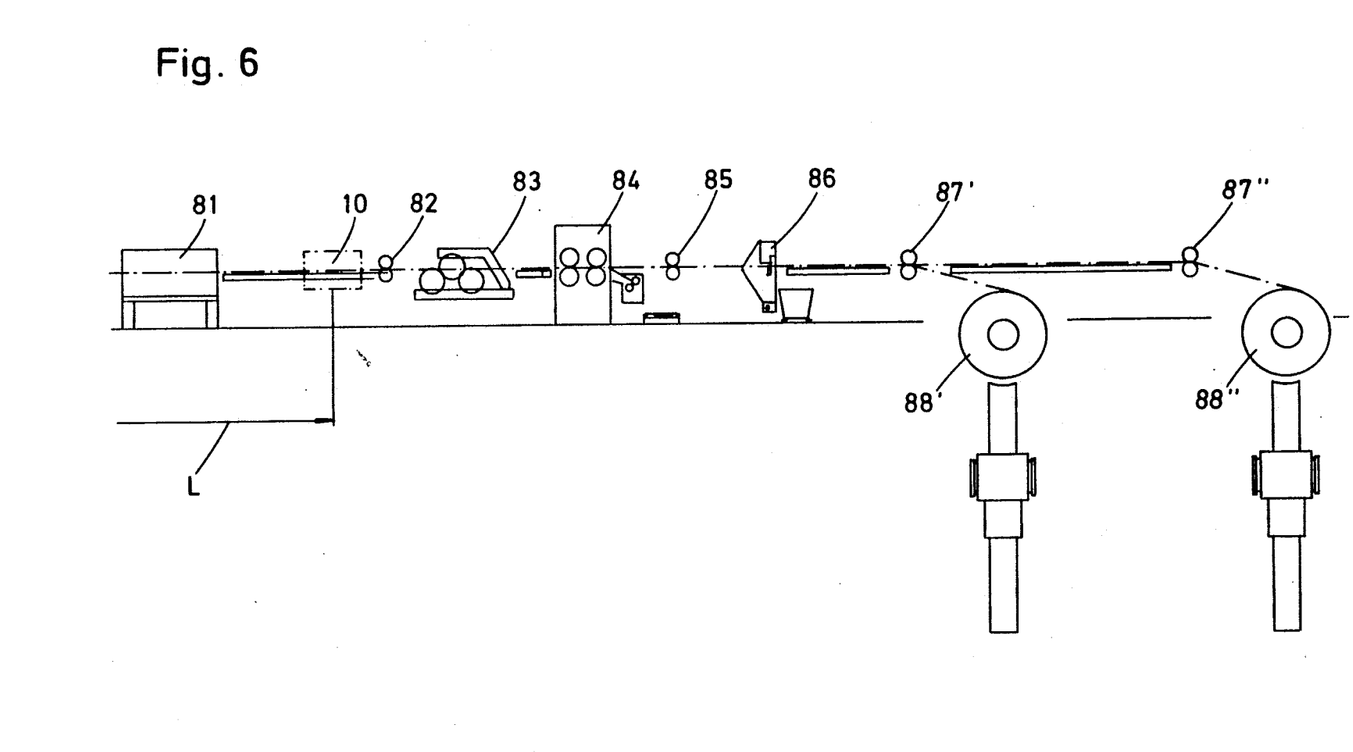
FIG. 6 is a schematic view of the exit portion of the pickling plant with the transfer carriage in the end position.

The operation of the feeding system according to the present invention as used in a pickling plant 70 with preheating and acid treatment shall no be explained in detail with the aid of FIGS. 5 and 6. The feeding system includes a magnetic drive for the transfer carriage 10 and a positively locking engagement between the strip and the transfer carriage 10 as illustrated in FIGS. 4a and 4b.

As illustrated in FIG. 5, in the entry portion of the plant, a strip centering means 73', 73", a hole punching means 74', 74" and another strip centering means 75', 75" are arranged following each straightening or levelling machine 72', 72" in strip conveying direction. The strip beginning (cf. FIG. 1, reference numeral 1) arriving from the uncoiler 71', 71" is centered in the two strip centering means 73', 75'; 73", 75", so that the center of the strip is in the center of the plant, independently of the width of the strip. The hole punching means 74', 74" arranged between the strip centering means punch round or elliptical holes (cf. FIG. 4b, reference numeral 1') into the strip beginning 1. The strip beginning 1 prepared in this manner is then fed to the transfer carriage 10 by means of the deflecting drive means 76', 76" and is centered with respect to the center of the plant by means of the strip centering means 77.

As mentioned above in the description of FIGS. 4a and 4b, the transfer carriage 10 has over the width of the strip a row of bores or slots 63 in which pivot levers 60 are rotatably mounted. The strip beginning 1 which is centered relative to the center of the plant automatically pushes the pivot levers 60 upwardly until they drop into the punched holes 1' in the strip or are forced into the holes by means of stationary, spring-biased insertion cams 65 arranged above the starting position of the transfer carriage 10. The diameters of the holes 1' in the strip 1 and the diameters of the pivot levers 60 are selected in such a way that the strip is securely held.

The transfer carriage 10 is now moved by means of a magnetic drive or the linear motor 20. As a result, the front edges of the pivot levers 60 are forced against the front edges 1' in the strip 1 and the rear edges of the pivot levers are pressed against the contact edges in the lower portion of the transfer carriage and, thus, a positively locking engagement is obtained. In the starting position and in the end position of the transfer carriage 10, the insertion cams 65, 66 into which the carriage 10 moves are arranged in such a way that the closing or opening of the pivot levers 60 is reinforced.

FIG. 6 of the drawings schematically illustrates the end position of the transfer carriage 10 in the exit portion of the pickling plant 70 with a dryer 81 arranged following the plant 70. In the end position of the transfer carriage 10 after traveling the conveying distance L, the strip beginning 1 is uncoupled and is received by the driver 82 and is moved in strip conveying direction to a strip control gear 83 and a trimming line 84 and is then picked up by another driver 85. After transversely cutting the strip in shears 86, the partial lengths of the strip are guided in the known manner by deflection drivers 87', 87" and are wound by coilers 88', 88".

FIG. 7 shows schematically the feeding system according to the present invention. To effect coupling and uncoupling of the strip beginning, a compressed air operated fastening device is provided inside the chamber of the transfer carriage. This includes a closed air element and a control for the compressed air for filing the air element with compressed air when clamping the strip beginning and releasing compressed air from the air element when detaching the strip beginning. The air element is a compressed air cushion element 40 with distributed air outlet, with which is associated a clamping plate 41 or clamping beam resting on a pair of compressed air operated lifting elements 42 for generating a friction coefficient. These lifting elements 42 have the function of lifting the clamping plate, releasing the strip beginning which is clamped against a horizontal lower chamber wall 12 of the chamber 11 during the transporting after relieving the compressed air in the air cushion 40, and releasing the clamping tension. To introduce, cut off and relieve the compressed air of the transfer carriage, the latter is constructed with so-called fixed docking plates at both front sides. A docking coupling plate which moves in a reciprocating manner in the transporting direction or in the opposite direction over a coupling distance is provided at the beginning and at the end of the conveying distance. The docking coupling plates are connected to stationary compressed air source via hose lines and the control for compressed air. The fixed docking plates of the transfer carriage and the movable docking coupling plates provide, at their opposite coupling faces, pressure holding function by means of plug-in connection for compressed air for the temporary coupling of the movable docking coupling plate to the fixed docking plate of the transfer carriage in order to clamp and detach the strip beginning during the transporting after the strip beginning has been transported to the end of the conveying distance While the invention has been illustrated and described as embodied in a feeding system for strip material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. In a feeding system for strip material for transporting a strip over a conveying distance of limited length, the improvement comprising the feeding system including a transfer carriage and a rail guide for guiding the transfer carriage, the transfer carriage defining a chamber for receiving the strip, the transfer carriage having means for fastening the strip during feeding of the strip over the conveying distance by temporarily holding the beginning of the strip, the transfer carriage having at both sides thereof a reversible linear motor each for driving the transfer carriage over the conveying distance, each linear motor having current-carrying active motor components and permanent magnets as reaction components, the active motor components being integrated int he rail guide and the reaction components being integrated in the transfer carriage, the transfer carriage being plate-shaped, the transfer carriage having at both sides thereof vertically extending flanges and horizontally extending flanges connected to the vertically extending flanges, the flanges extending in travel direction of the carriage and forming chambers which are open toward the center of the carriage, the rail guide having outwardly directed horizontal webs for engagement in the chambers in a labyrinth-like manner, the rail guide having additional outer horizontal webs and vertically upwardly extending webs, wherein the horizontal web is located underneath the horizontal flange of the transfer carriage and the vertical webs are located outside of the vertically extending flange of the carriage, the vertical and horizontal flanges of the transfer carriage being equipped with guide rollers with vertically and horizontally extending axes for guiding the transfer carriage on the vertical and horizontal webs of the rail guide, the horizontal webs of the rail guide extending into the chambers being provided on the bottom surfaces thereof with the active motor components and the horizontal flanges of the transfer carriage being provided on the upper surfaces thereof with the permanent magnets of the reaction components of the linear motors.

2. The feeding system according to claim 1, wherein the strip receiving chamber has a lower chamber wall on which the strip beginning rests, the strip fastening means comprising a clamping plate located in the strip receiving chamber and an air cushion element operated by compressed air and also located int he strip receiving chamber, the clamping plate being arranged underneath the compressed air cushion element and resting on a pair of compressed air lifting elements for lifting the clamping plate after the cushion element is evacuated.

3. In a feeding system for strip material for transporting a strip over a conveying distance of limited length, the improvement comprising the feeding system including a transfer carriage and a rail guide for guiding the transfer carriage, the transfer carriage defining a chamber for receiving the strip, the transfer carriage having means for fastening the strip during feeding of the strip over the conveying distance by temporarily holding the beginning of the strip, the transfer carriage having at both sides thereof a reversible linear motor each for driving the transfer carriage over the conveying distance, wherein the means for fastening the strip beginning is an air cushion element operated by compressed air and fixed within said strip receiving chamber of the transfer carriage for effecting a frictional engagement with the strip beginning, said air cushion element comprising a closing air cushion and means for controlling the compressed air and generating a negative pressure when the pressure is released, the strip fastening means further including a clamping plate arranged beneath the air cushion element, the transfer carriage being plate-shaped and acting on the compressed air cushion element for generating a frictional pressure force on the clamping plate, the clamping plate being arranged on a pair of compressed air-operated lifting elements for lifting the clamping plate when the pressure in the compressed air-operated cushion element is released, the strip receiving chamber having a lower chamber wall, the strip beginning resting on the lower chamber wall and being clamped between the clamping plate and the lower chamber wall when the closed air cushion is filled with compressed air.

4. The feeding system according to claim 3, wherein the transfer carriage comprises a fixed docking plate for introducing, blocking and releasing compressed air, a coupling docking plate each being provided at the beginning and at the end of the conveying distance, each coupling docking plate being movable back and forth over a coupling distance, the movable coupling docking plates being connected through hose lines to stationary compressed air sources, the fixed docking plate of the transfer carriage and the movable coupling docking plates having at oppositely located end faces thereof compressed air-operated stretching connections for compressed air with pressure maintaining function and including means for the temporary coupling of the movable coupling docking plates to the fixed docking plates of the carriage, so that the strip beginning is clamped during the movement and is released after the strip beginning has reached the end of the conveying distance.

* * * * *